United States Patent
Chu et al.

(10) Patent No.: US 10,164,554 B2
(45) Date of Patent: Dec. 25, 2018

(54) MOTOR AND MOTOR CONTROL METHOD

(71) Applicant: ANPEC ELECTRONICS CORPORATION, Hsinchu (TW)

(72) Inventors: Chien-Lun Chu, Kaohsiung (TW); Ching-Feng Lai, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/724,865

(22) Filed: Oct. 4, 2017

(65) Prior Publication Data
US 2018/0342966 A1   Nov. 29, 2018

(30) Foreign Application Priority Data
May 26, 2017 (TW) .............................. 106117603 A

(51) Int. Cl.
| | |
|---|---|
| H02P 1/46 | (2006.01) |
| H02P 6/26 | (2016.01) |
| H02K 1/27 | (2006.01) |
| H02K 11/215 | (2016.01) |
| H02K 1/14 | (2006.01) |
| H02K 11/33 | (2016.01) |
| H02K 7/14 | (2006.01) |

(52) U.S. Cl.
CPC .............. *H02P 6/26* (2016.02); *H02K 1/148* (2013.01); *H02K 1/2786* (2013.01); *H02K 11/215* (2016.01); *H02K 11/33* (2016.01); *H02K 7/14* (2013.01)

(58) Field of Classification Search
CPC ...... H02P 1/00; H02P 3/00; H02P 6/00; H02P 7/00; H02P 9/00; H02P 23/00; H02P 27/00; H02P 1/46; H02P 3/18; H02P 41/00; H02P 41/02
USPC ............ 318/400.01, 400.02, 400.07, 400.14, 318/400.15, 700, 701, 727, 779, 799, 800, 318/801, 430, 432, 437, 599, 811; 310/49.32, 49.08, 49.09, 49.29, 49.37, 310/323.04, 323.21, 49.44, 156.01, 310/156.05, 216.042, 216.107, 261.1, 310/262, 269
See application file for complete search history.

(56) References Cited

U.S. PATENT DOCUMENTS 8,847,522 B2 * 9/2014 Nashiki ................... H02K 1/12
                                                                310/162

FOREIGN PATENT DOCUMENTS

TW              201106606 A1      2/2011

* cited by examiner

*Primary Examiner* — Antony M Paul
(74) *Attorney, Agent, or Firm* — Li & Cai Intellectual Property (USA) Office

(57) ABSTRACT

Disclosed is a motor. The motor is electrically connected to a control module. The motor includes a stator and a rotor. The stator includes a first stator module and a second stator module. The first stator module is configured beside the second stator module. A mechanical phase converting line is defined as a center position between the first stator module and the second stator module. The rotor is configured around the stator. The first phase detector is configured at one side of the mechanical phase converting line, and the first phase detector and the first stator module are configured at the same side of the mechanical phase converting line.

12 Claims, 8 Drawing Sheets

MOTOR AND MOTOR CONTROL METHOD

BACKGROUND OF THE INVENTION

1. Field of the Invention

The present disclosure relates to a motor; in particular, to a motor using a symmetrical stator module.

2. Description of Related Art

In a traditional single phase motor, an unsymmetrical stator module is usually used to overcome a reverse rotation of the motor. In some cases, the unsymmetrical stator module and the position design of a phase detector help to overcome the reverse rotation of the motor. However, it is complex to design an unsymmetrical stator module, and the design complexity makes the cost and the time consumption for manufacturing a motor increase.

Accordingly, it is necessary to develop a motor using a symmetrical stator module and a corresponding motor control system and method.

SUMMARY OF THE INVENTION

The present disclosure provides a motor. This motor is electrically connected to a control module, and includes a stator, a rotor and a first phase detector. The stator includes a first stator module and a second stator module. The first stator module is configured beside the second stator module, and a mechanical phase converting line is defined as a center position between the first stator module and the second stator module. The rotor is configured around the stator. The rotor rotates according to a first rotation direction or a second rotation direction. The first rotation direction is defined by a rotation from the position of the first stator module to the position of the second stator module, and the second rotation direction is defined by a rotation from the position of the second stator module to the position of the first stator module. The first phase detector is configured on the stator. The first phase detector is configured at one side of the mechanical phase converting line, and the first phase detector and the first stator module are configured at the same side of the mechanical phase converting line. When the rotor stops rotating, the magnetic phase converting point remains within a range defined by an angle range having the mechanical phase converting line as a center line.

In one of the embodiments of the motor provided by the present disclosure, the rotator includes a first rotor module and a second rotor module. The second rotor module is configured beside the first rotor module.

In one of the embodiments of the motor provided by the present disclosure, the first stator module has a first coil, the second stator module has a second coil, and a resultant moment is generated by the first coil and the second coil to drive the motor.

In one of the embodiments of the motor provided by the present disclosure, a magnetic phase converting point is defined as a center position between the first rotor module and the second rotor module.

In one of the embodiments of the motor provided by the present disclosure, when the rotor is rotating according to the first rotation direction and the first phase detector passes through the magnetic phase converting point, the resultant moment is generated by the first coil and the second coil for a phase converting.

In one of the embodiments of the motor provided by the present disclosure, when the magnetic phase converting point is between the first phase detector and the mechanical phase converting line, the control module generates a soft-switching driving signal or an advanced phase driving signal to drive the motor.

In one of the embodiments of the motor provided by the present disclosure, the motor further includes a second phase detector. The second phase detector is configured at the other side of the mechanical phase converting line, and the second phase detector and the second stator module are configured at the same side of the mechanical phase converting line.

The present disclosure also provides a motor control method to control a motor. The motor includes a stator, a rotor and a first phase detector. The stator includes a first stator module and a second stator module. The first stator module is configured beside the second stator module, and a mechanical phase converting line is defined as a center position between the first stator module and the second stator module. The first stator module and the second stator module are both symmetrical stator modules. The rotor includes a first rotor module and a second rotor module. A magnetic phase converting point is defined as a center position between the first rotor module and the second rotor module. The first phase detector is configured at one side of the mechanical phase converting line, and the first phase detector and the first stator module are configured at the same side of the mechanical phase converting line. A control module provides a driving signal to the motor through at least one switch. The motor control method includes: driving the motor to rotate according to a rotation direction; when the magnetic phase converting point is between the mechanical phase converting line and the first phase detector, generating a soft-switching driving signal or an advanced phase driving signal by the control module to drive the motor; and making the motor rotate according to a first rotation direction.

In one of the embodiments of the motor control method provided by the present disclosure, the rotation direction is different from the first rotation direction.

In one of the embodiments of the motor control method provided by the present disclosure, the rotation direction is the first rotation direction.

In one of the embodiments of the motor control method provided by the present disclosure, when the magnetic phase converting point passes through the first phase detector, the control module generates a phase-converting control signal according to a phase detection signal provided by the first phase detector to make the motor rotate reversely.

The motor provided by the present disclosure has at least one phase detector. In the motor control method provided by the present disclosure, according to the position design of the phase detector and the position variation of the magnetic phase converting point, an advanced phase driving signal or a soft-switching driving signal is provided for driving the motor to rotate normally.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

[One Embodiment of the Motor Control System]

Figure 1:
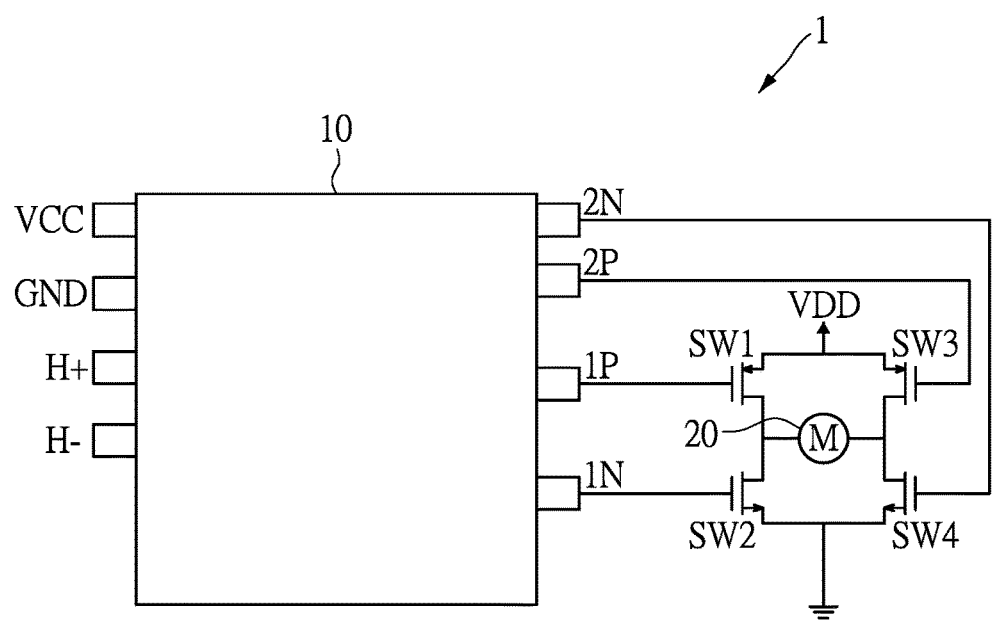
FIG. 1 shows a schematic diagram of a motor control system according to one embodiment of the present disclosure.

Referring to FIG. 1, a schematic diagram of a motor control system according to one embodiment of the present disclosure is shown.

As shown in FIG. 1, the motor control system 1 includes a control module 10, a motor 20, a first switch SW1, a second switch SW2, a third switch SW3 and a fourth switch SW4.

The control module 10 has a power pin VCC, a grounding pin GND, a first phase detection pin H+, a second phase detection pin H−, a first driving pin 1P, a second driving pin 1N, a third driving pin 2P and a fourth driving pin 2N.

In this embodiment, the power pin VCC of the control module 10 is coupled to a direct voltage VDD to drive the control module 10. The grounding pin GND of the control module 10 is coupled to a grounding voltage. The first phase detection pin H+ and the second phase detection pin H− of the control module 10 are electrically connected to a phase detector to receive a phase variation of the motor 20.

The first driving pin 1P is electrically connected to the second end of the first switch SW1, the second driving pin 1N is electrically connected to the second end of the second switch SW2, the third driving pin 2P is electrically connected to the second end of the third switch SW3, and the fourth driving pin 2N is electrically connected to the second end of the fourth switch SW4, to provide a driving signal respectively to the first switch SW1, the second switch SW2, the third switch SW3 and the fourth switch SW4.

The first end of the first switch SW1 and the first end of the third switch SW3 are coupled to a direct voltage VDD. The third end of the first switch SW1 is electrically connected to the first end of the second switch SW2 and one end of the motor 20. The third end of the third switch SW3 is electrically connected to the first end of the fourth switch SW4 and the other end of the motor 20. The third end of the second switch SW2 and the third end of the fourth switch SW4 are coupled to a grounding voltage.

FIGS. 2A~2D are schematic diagrams showing the forward rotation of the motor.

The motor 20 includes a stator 21, a rotor 22 and a first phase detector 23. The stator 21 includes a first stator module 211 and a second stator module 212. The first stator module 211 is configured beside the second stator module 212. A mechanical phase converting line 21A is defined as a center position between the first stator module 211 and the second stator module 212. The first phase detector 23 is configured on the stator 21. In this embodiment, the first stator module 211 and the second stator module 212 are both symmetrical stator modules, as shown in FIGS. 2A~2D. The stator 21 has four mechanical phase converting lines 21A. The included angle δ between every two adjacent mechanical phase converting lines 21A is always 90°.

The rotor 22 includes a first rotor module 221, a second rotor module 222, a third rotor module 223 and a fourth rotor module 224. A magnetic phase converting point 22A is defined as a center position between the first rotor module 221 and the second rotor module 222.

Figure 2A:
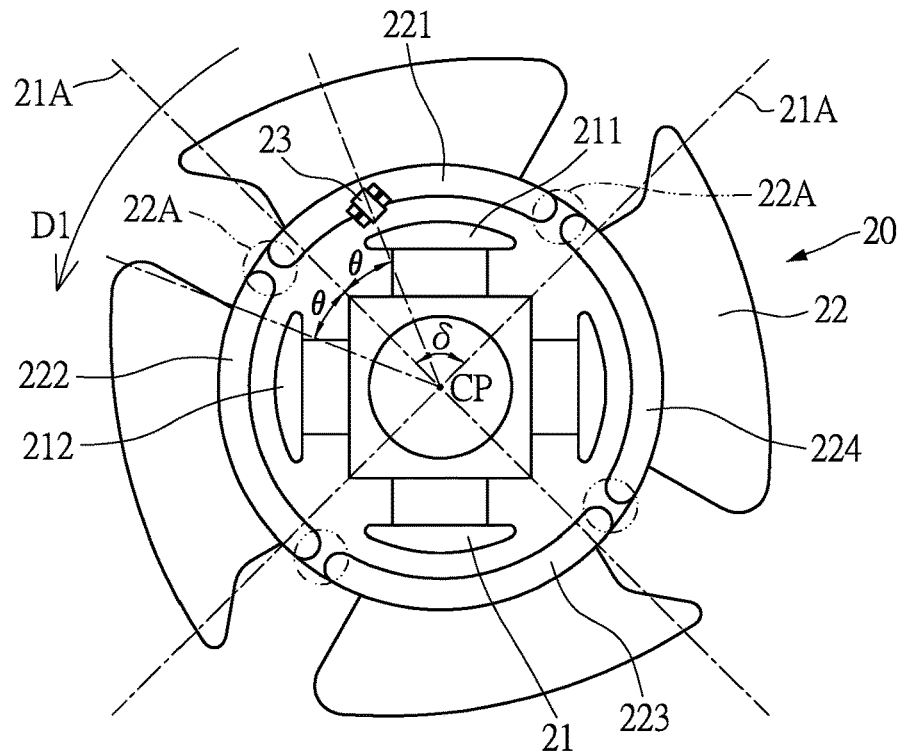
FIGS. 2A~2D are schematic diagrams showing the forward rotation of the motor.
Figure 2B:
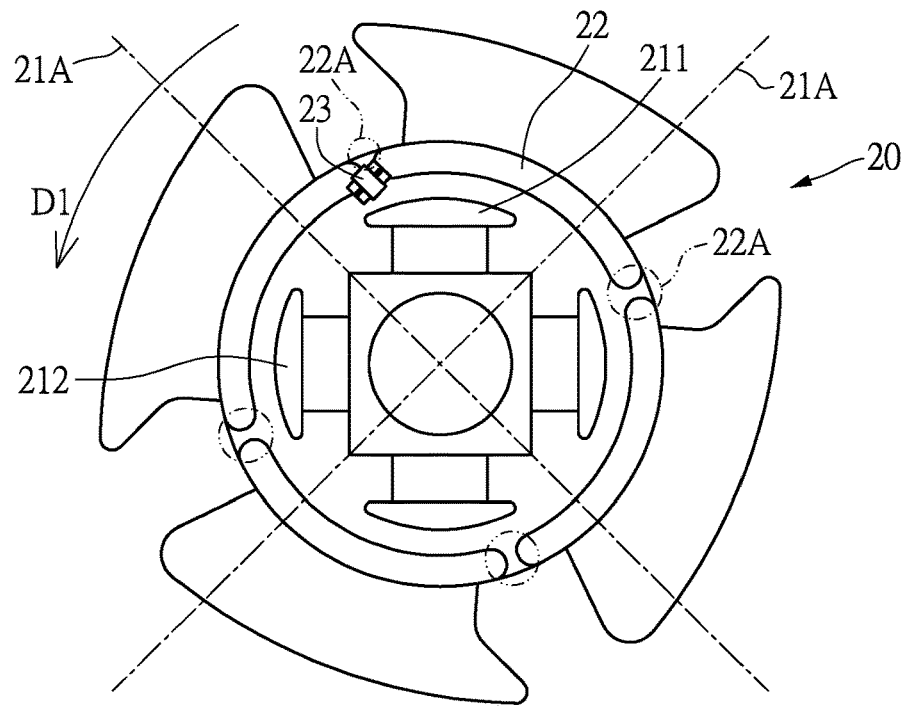

In FIG. 2A, the rotor 22 of the motor 20 starts to rotate according to a first rotation direction D1. In FIG. 2B, the magnetic phase converting point 22A of the motor 20 passes through the first phase detector 23. In this stage, for a phase converting, the control module 10 provides a current to the first coil of the first stator module 211 and to the second coil of the second stator module 212 by controlling the first switch SW1, the second switch SW2, the third switch SW3 and the fourth switch SW4. Specifically, when the first phase detector 23 detects that the first rotor module 221 and the fourth rotor module 224 exchange their positions, the first phase detector 23 generates a phase detection signal to the control module 10, such that the control module 10 provides a current to the first coil (not shown) and to the second coil (not shown) for a phase converting.

In this embodiment, the stator 21 has a center point CP. Within one side of the mechanical phase converting line 21A, there is an included angle θ between the mechanical phase converting line 21A and a line formed by the position of the first phase detector 23 and the center point CP. Take the mechanical phase converting line 21A as the center line, there is a mirrored angle of the included angle θ within the other side of the mechanical phase converting line 21A. However, it should be noted that, in this embodiment, there is no phase detector configured within the other side of the mechanical phase converting line 21A.

Again referring to FIG. 2A, the magnetic phase converting point 22A remains within a range defined by the above mirrored angle θ within the other side of the mechanical phase converting line 21A. In this embodiment, the angle θ can be 15°~25°. In other embodiments, the angle θ can be 20°. In short, when the rotor 22 stops rotating, the magnetic phase converting point 22A remains within a range defined by the above mirrored angle θ within a side of the mechanical phase converting line 21A wherein the second stator module 212 is configured.

Moreover, the first rotation direction D1 is defined by a rotation from the position of the first stator module 211 to the position of the second stator module 212, and the second rotation direction D2 is defined by a rotation from the position of the second stator module 212 to the position of the first stator module 211.

Figure 2C:
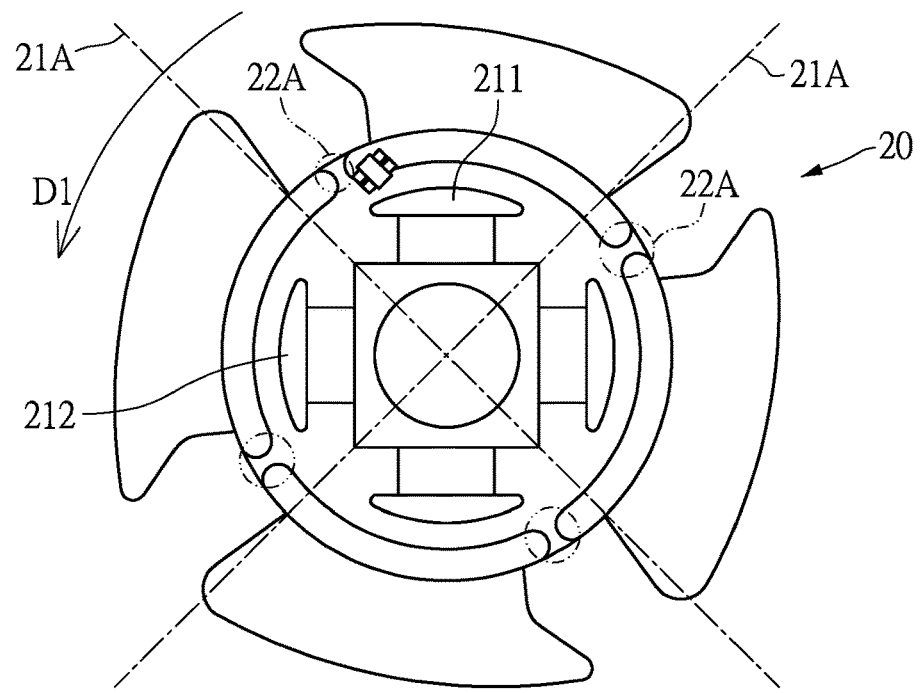

In FIG. 2C, before the magnetic phase converting point 22A passes through the mechanical phase converting line 21A but after the magnetic phase converting point 22A passes through the first phase detector 23, the resultant moment generated by the first coil (not shown) and the second coil (not shown) tends to make the rotor 22 rotate according to the second rotation direction D2. However, the rotor rotates originally according to the first rotation direction D1, so the inertia of rotation makes the rotor 22 resist the resultant moment.

Thus, before the magnetic phase converting point 22A passes through the mechanical phase converting line 21A but after the magnetic phase converting point 22A passes through the first phase detector 23, the control module 10 controls the first switch SW1, the second switch SW2, the third switch SW3 and the fourth switch SW4 to delay a predetermined time or to work in a soft-switching mode for reducing or eliminating the current flowing through the first coil (not shown) and the current flowing through the second coil (not shown), such that the resistance of the rotor 22 to the resultant moment can be decreased.

Figure 2D:
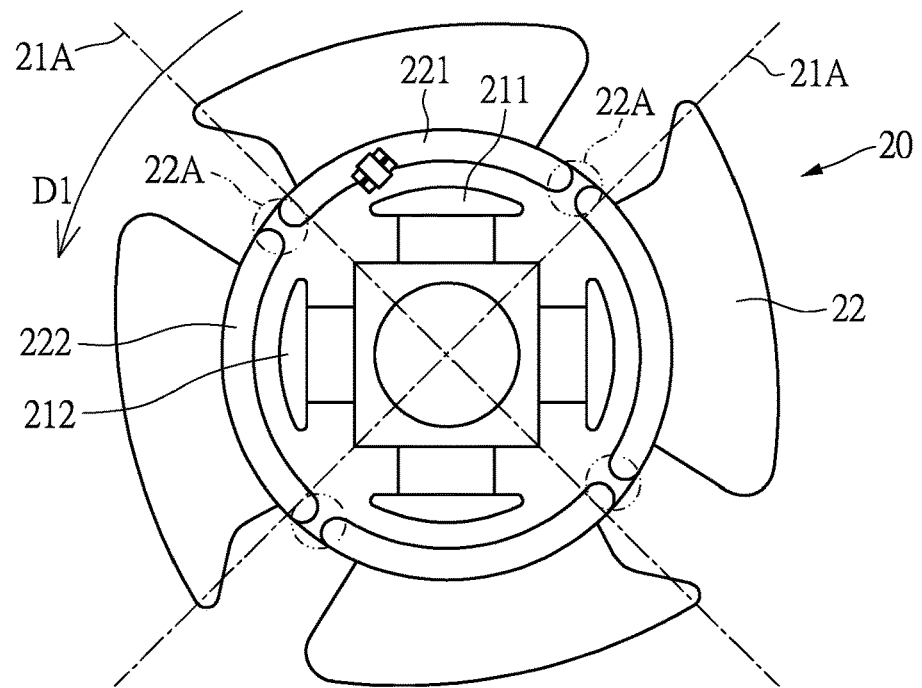

In FIG. 2D, after the magnetic phase converting point 22A passes through the mechanical phase converting line 21A, the resultant moment makes the motor 20 normally rotate according to the first rotation direction D1.

Figure 3:
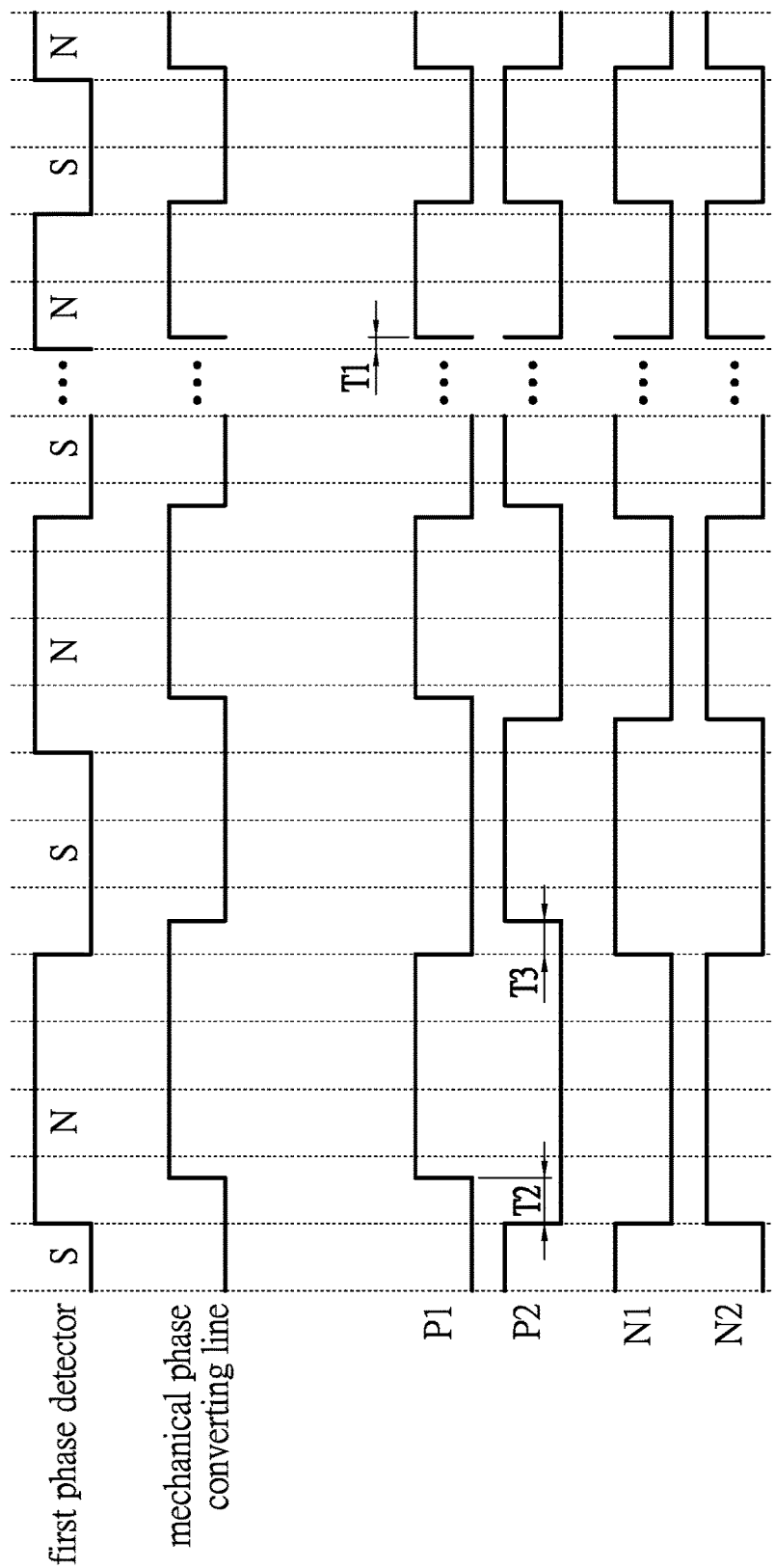
FIG. 3 shows a waveform diagram of the motor that is rotating forward according to one embodiment of the present disclosure.

Referring to FIG. 3, a waveform diagram of the motor that is rotating forward according to one embodiment of the present disclosure is shown.

As shown in FIG. 3, the timing when the rotor 22 passes through the mechanical phase converting line 21A is later than the timing when the rotor 22 passes through the phase detector 23. At the first time point T1, the driving signal provided by the first driving pin P1, the driving signal provided by the second driving pin N1, the driving signal provided by the third driving pin P2 and the driving signal provided by the fourth driving pin N2 include an advanced phase driving signal.

At the second time point T2, the driving signal provided by the first driving pin P1 includes a soft-switching driving signal, and at the third time point T3, the driving signal provided by the third driving pin P2 includes a soft-switching driving signal.

Figure 4A:
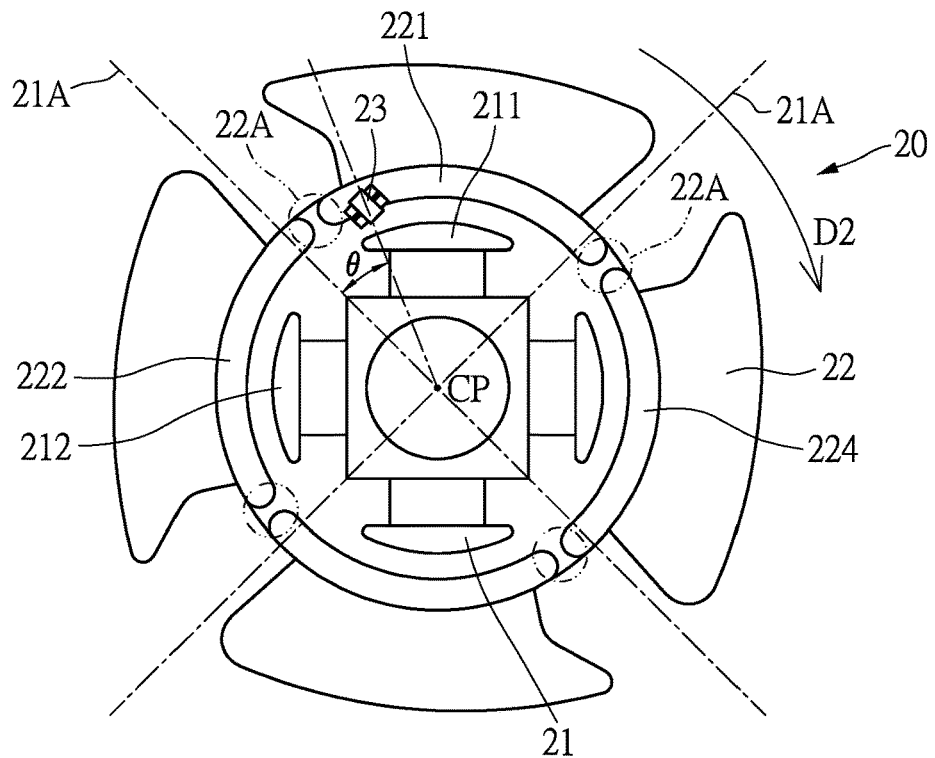
FIGS. 4A~4D are schematic diagrams showing the reverse rotation of the motor.
Figure 4B:
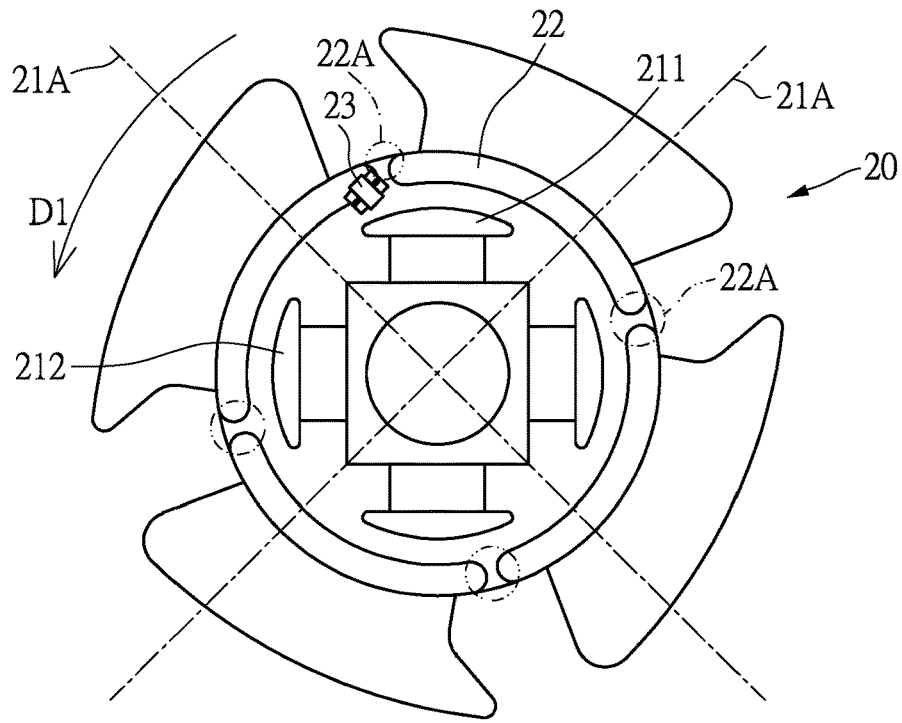

FIGS. 4A~4D are schematic diagrams showing the reverse rotation of the motor. In FIG. 4A, the rotor 22 of the motor 20 starts to rotate according to the second rotation direction D2. In this stage, the magnetic phase converting point 22a is between the first phase detector 23 and the mechanical phase converting line 21A. In FIG. 4B, the magnetic phase converting point 22A passes through the first phase detector 23. For a phase converting, the control module 10 provides a current to the first coil of the first stator module 211 and to the second coil of the second stator module 212 by controlling the first switch SW1, the second switch SW2, the third switch SW3 and the fourth switch SW4. Specifically, when the first phase detector 23 detects that the first rotor module 211 and the fourth rotor module 214 exchange their positions, the first phase detector 23 generates a phase detection signal to the control module 10, such that the control module 10 provides a current to the first coil (not shown) and to the second coil (not shown) for a phase converting. In this case, the resultant moment generated by the first coil (not shown) and the second coil (not shown) makes the rotor 22 of the motor 20 rotate according to the first rotation direction D1.

Again referring to FIG. 4A, the magnetic phase converting point 22A remains within an included angle θ between the mechanical phase converting line 21A and a line formed by the position of the first phase detector 23 and the center point CP. In this embodiment, the included angle θ is 15°~25°. In other embodiments, the included angle θ can be 20°. In short, when the rotor 22 stops rotating, the magnetic phase converting point 22A remains within a range defined by the included angle θ within a side of the mechanical phase converting line 21A wherein the second stator module 212 is configured.

Figure 4C:
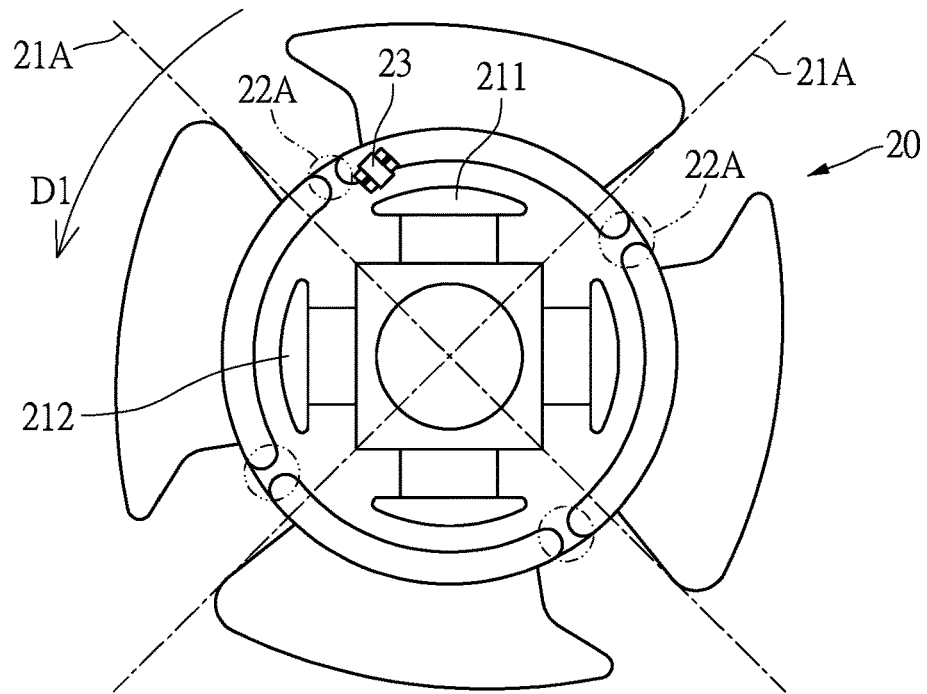

In FIG. 4C, before the magnetic phase converting point 22A passes through the mechanical phase converting line 21A but again passes through the first phase detector 23, the resultant moment generated by the first coil (not shown) and the second coil (not shown) tends to make the rotor 22 rotate according to the second rotation direction D2. However, the rotor rotates originally according to the first rotation direction D1, so the inertia of rotation makes the rotor 22 resist the resultant moment.

Thus, before the magnetic phase converting point 22A passes through the mechanical phase converting line 21A but after the magnetic phase converting point 22A passes through the first phase detector 23, the control module 10 controls the first switch SW1, the second switch SW2, the third switch SW3 and the fourth switch SW4 to delay a predetermined time or to work in a soft-switching mode for reducing or eliminating the current flowing through the first coil (not shown) and the current flowing through the second coil (not shown), such that the resistance of the rotor 22 to the resultant moment can be decreased.

Figure 4D:
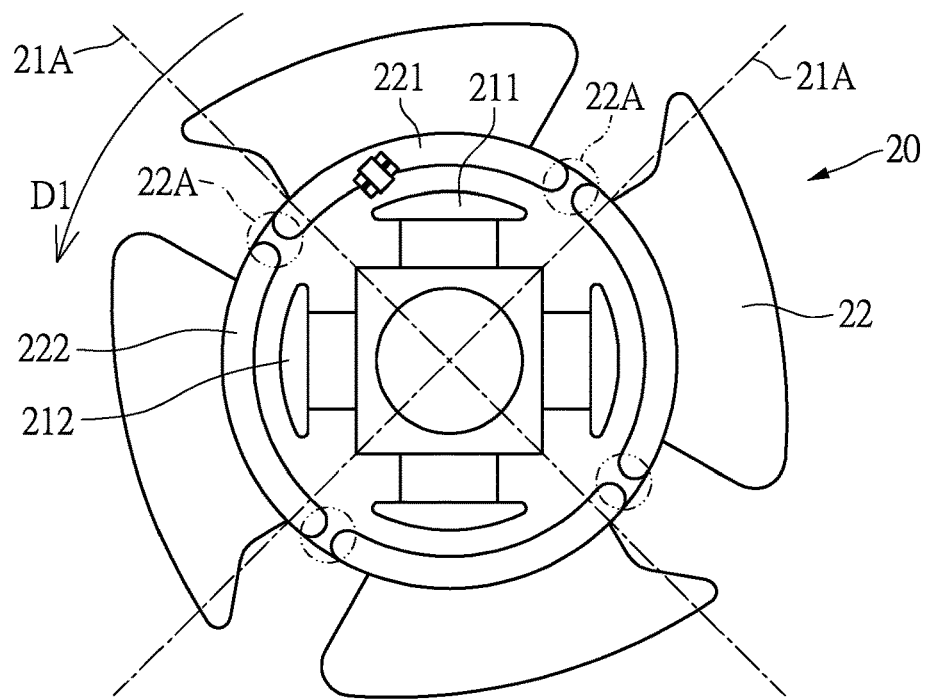

In FIG. 4D, after the magnetic phase converting point 22A passes through the mechanical phase converting line 21A, the resultant moment makes the motor 20 normally rotate according to the first rotation direction D1.

Figure 5:
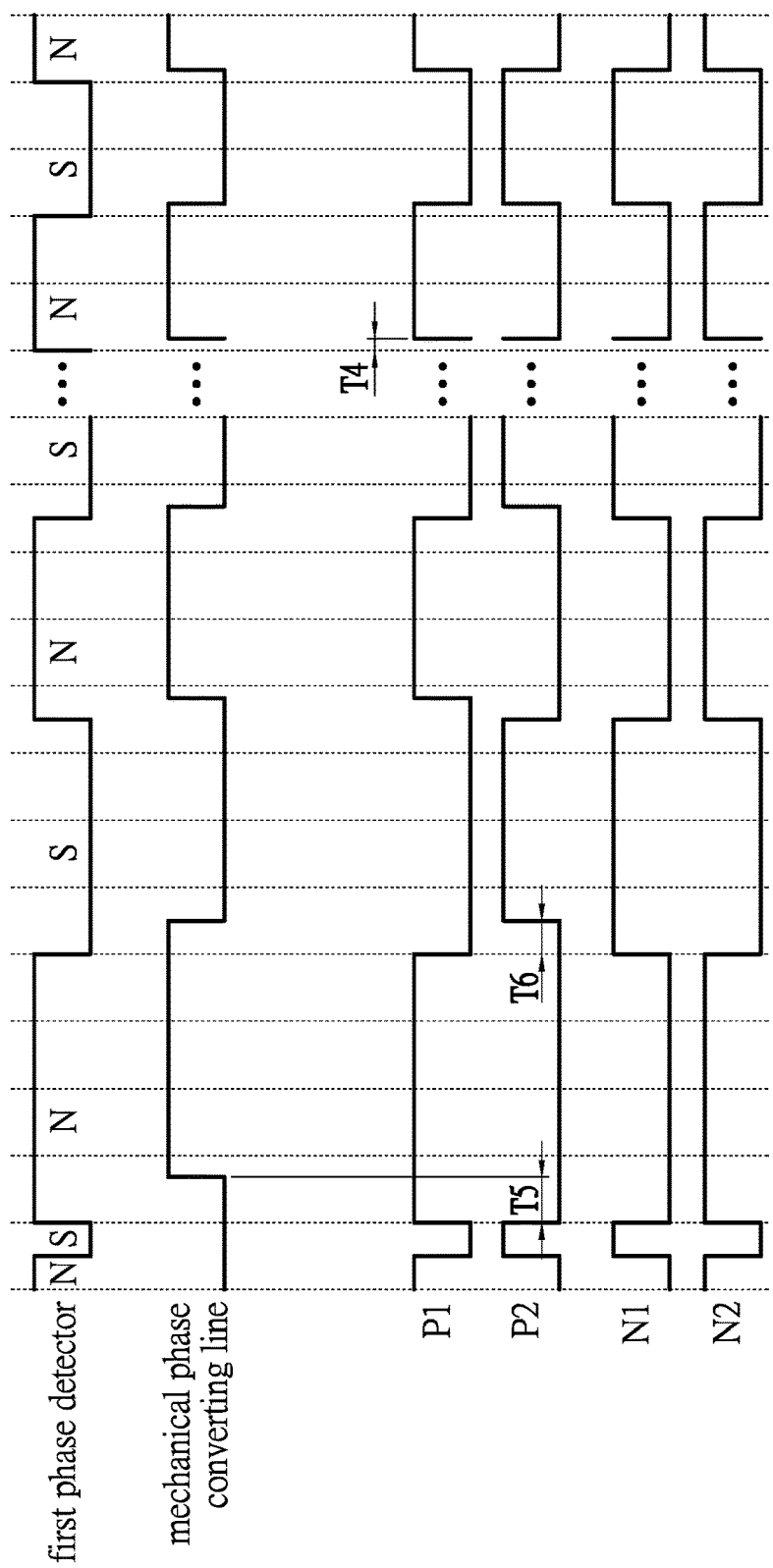
FIG. 5 shows a waveform diagram of the motor that is rotating reversely according to one embodiment of the present disclosure.

Referring to FIG. 5, a waveform diagram of the motor that is rotating reversely according to one embodiment of the present disclosure is shown.

As shown in FIG. 5, the timing when the rotor 22 passes through the mechanical phase converting line 21A is later than the timing when the rotor 22 passes through the phase detector 23. At the fourth time point T4, the driving signal provided by the first driving pin P1, the driving signal provided by the second driving pin N1, the driving signal provided by the third driving pin P2 and the driving signal provided by the fourth driving pin N2 include an advanced phase driving signal.

At the fifth time point T5, the driving signal of the provided by the third driving pin P1 includes a soft-switching driving signal, and at the sixth time point T6, the driving signal of the provided by the third driving pin P2 includes a soft-switching driving signal.

Figure 6:
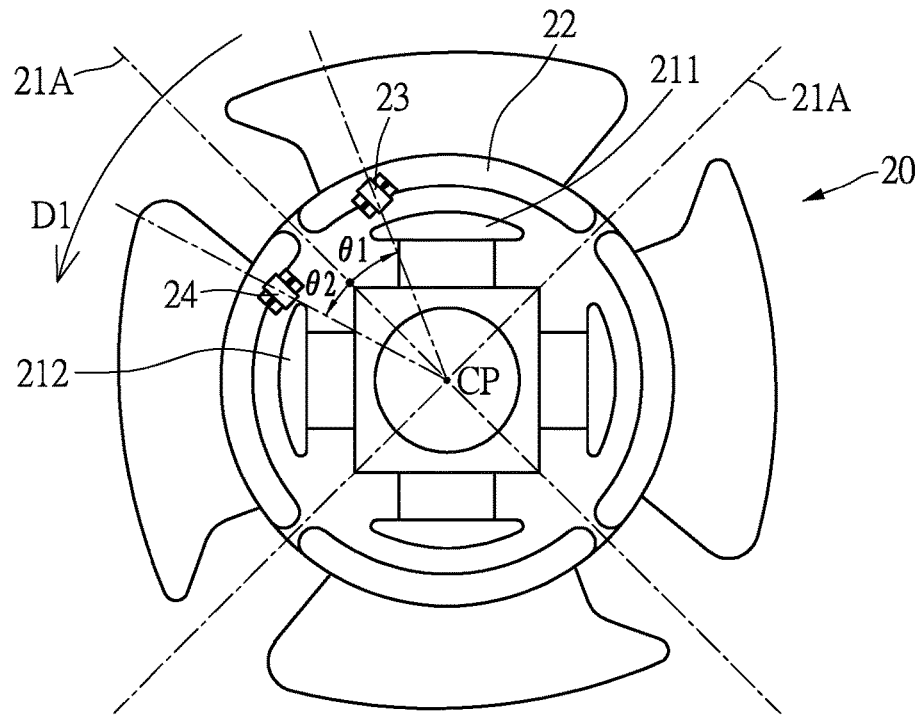
FIG. 6 shows a schematic diagram of a motor control system according to another embodiment of the present disclosure.

Referring to FIG. 6, a schematic diagram of a motor control system according to another embodiment of the present disclosure is shown.

As shown in FIG. 6, the motor 20 includes a stator 21, a rotor 22, a first phase detector 23 and a second phase detector 24. The first phase detector 23 and the second phase detector 24 are configured on the stator 21. The first phase detector 23 is configured within one side of the mechanical phase converting line 21A, and the second phase detector 24 is configured within the other side of the mechanical phase converting line 21A.

In FIG. 6, an included angle between the mechanical phase converting line 21A and a line formed by the first phase detector 23 and the center point CP of the stator 21 is defined as a first angle θ1, and an included angle between the mechanical phase converting line 21A and a line formed by the second phase detector 24 and the center point CP of the stator 21 is defined as a second angle θ2. In this embodiment, the first angle θ1 is equal to the second angle θ2; however, in other embodiments, the first angle θ1 can be unequal to the second angle θ2.

By using the first phase detector 23 and the second phase detector 24, the rotation of the motor 20 can be detected (the motor 20 may rotate according to the first rotation direction D1 or according to the second rotation direction D2) such that the control module 10 can control the switches to make sure that the motor normally works.

It should be noted that, in this embodiment, when the rotor 22 tends to rotate according to the first rotation direction D1, the first phase detector 23 is the dominate phase detector. In other words, the phase variation detected by the second phase detector 24 can be omitted. On the other hand, when the rotor 22 tends to rotate according to the second rotation direction D2, the second phase detector 24 is the dominate phase detector. In other words, the phase variation detected by the first phase detector 23 can be omitted.

Figure 7:
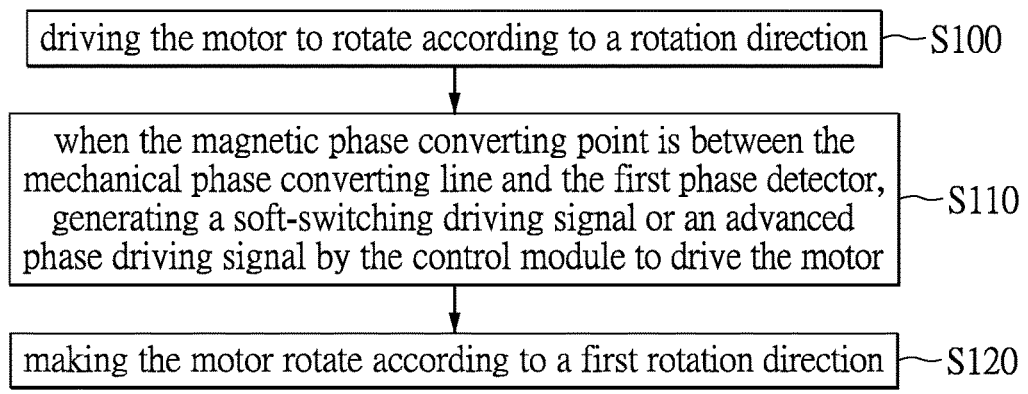
FIG. 7 shows a flow chart of a motor control method according to one embodiment of the present disclosure.

Referring to FIG. 7, a flow chart of a motor control method according to one embodiment of the present disclosure is shown.

The motor control method provided by this embodiment can be adapted to the motor provided in the last embodiment. Details related to the motor are not described repeatedly.

The motor control method includes: driving the motor to rotate according to a rotation direction (step S100); when the magnetic phase converting point is between the mechanical phase converting line and the first phase detector, generating a soft-switching driving signal or an advanced phase driving signal by the control module to drive the motor (step S110); and making the motor rotate according to a first rotation direction (step S120).

In step S100, the control module 10 drives the motor 20 to rotate according to the first rotation direction D1 or the second rotation direction D2. When the original rotation direction of the motor 20 is the first rotation direction D1, step S110 of the method is executed. On the other hand, when the original rotation direction of the motor 20 is not the first rotation direction D1 (when the original rotation direction of the motor 20 is the second rotation direction D2), the control module 10 generates a phase-converting control signal to make the motor 20 rotate reversely. Specifically, when the magnetic phase converting point 22A passes through the first phase detector 23, the control module 10 generates a phase-converting control signal according to a phase detection signal from the first phase detector 23 to make the motor 20 rotate reversely. After that, step S110 of the method is executed.

In step S110, the advanced phase driving signal can be considered a correction for the delay or the leading of the next driving signal. The soft-switching driving signal, which is a pulse width modulation signal, is used to adjust the current flowing through the first coil (not shown) of the first stator module 211 and the current flowing through the second coil (not shown) of the second stator module 212 when the magnetic phase converting point is between the mechanical phase converting line and the first phase detector for decreasing the resistance of the rotor 22 to the resultant moment.

The motor provided by the present disclosure has at least one phase detector. In the motor control method provided by the present disclosure, according to the position design of the phase detector and the position variation of the mechanical phase converting point, an advanced phase driving signal or a soft-switching driving signal is provided for driving the motor to rotate normally.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A motor, electrically connected to a control module, comprising:
    a stator, including:
        a first stator module; and
        a second stator module, wherein the first stator module is configured beside the second stator module, and a mechanical phase converting line is defined as a center position between the first stator module and the second stator module;
    a rotor, configured around the stator, wherein the rotor rotates according to a first rotation direction or a second rotation direction, the first rotation direction is defined by a rotation from the position of the first stator module to the position of the second stator module, and the second rotation direction is defined by a rotation from the position of the second stator module to the position of the first stator module; and
    a first phase detector, configured on the stator;
    wherein the first phase detector is configured at one side of the mechanical phase converting line, and the first phase detector and the first stator module are configured at the same side of the mechanical phase converting line;
    wherein when the rotor stops rotating, the magnetic phase converting point remains within a range defined by an angle range having the mechanical phase converting line as a center line.

2. The motor according to claim 1, wherein the rotator includes:
    a first rotor module; and
    a second rotor module, wherein the second rotor module is configured beside the first rotor module.

3. The motor according to claim 2, wherein the first stator module has a first coil, the second stator module has a second coil, and a resultant moment is generated by the first coil and the second coil to drive the motor.

4. The motor according to claim 3, wherein a magnetic phase converting point is defined as a center position between the first rotor module and the second rotor module.

5. The motor according to claim 4, wherein when the rotor is rotating according to the first rotation direction and the first phase detector passes through the magnetic phase converting point, the resultant moment is generated by the first coil and the second coil for a phase converting.

6. The motor according to claim 5, wherein when the magnetic phase converting point is between the first phase detector and the mechanical phase converting line, the control module generates a soft-switching driving signal or an advanced phase driving signal to drive the motor.

7. The motor according to claim 6, further comprising:
    a second phase detector, wherein the second phase detector is configured at the other side of the mechanical phase converting line, and the second phase detector and the second stator module are configured at the same side of the mechanical phase converting line.

8. A motor control method to control a motor, wherein the motor includes a stator, a rotor and a first phase detector, the stator includes a first stator module and a second stator module, the first stator module is configured beside the second stator module, a mechanical phase converting line is defined as a center position between the first stator module and the second stator module, the first stator module and the second stator module are both symmetrical stator modules, the rotor includes a first rotor module and a second rotor module, a magnetic phase converting point is defined as a center position between the first rotor module and the second rotor module, the first phase detector is configured at one side of the mechanical phase converting line and the first phase detector and the first stator module are configured at the same side of the mechanical phase converting line, and a control module provides a driving signal to the motor through at least one switch, the motor control method comprising:

driving the motor to rotate according to a rotation direction;

when the magnetic phase converting point is between the mechanical phase converting line and the first phase detector, generating a soft-switching driving signal or an advanced phase driving signal by the control module to drive the motor; and making the motor rotate according to a first rotation direction.

9. The motor control method according to claim 8, wherein the rotation direction is different from the first rotation direction.

10. The motor control method according to claim 9, wherein when the magnetic phase converting point passes through the first phase detector, the control module generates a phase-converting control signal according to a phase detection signal provided by the first phase detector to make the motor rotate reversely.

11. The motor control method according to claim 8, wherein the rotation direction is the first rotation direction.

12. The motor control method according to claim 8, wherein when the rotor stops rotating, the magnetic phase converting point remains within a range defined by an angle range having the mechanical phase converting line as a center line.

* * * * *